(12) United States Patent
Sarkkinen et al.

(10) Patent No.: US 7,031,708 B2
(45) Date of Patent: Apr. 18, 2006

(54) SYSTEM AND METHOD FOR CONNECTING MULTICAST OR BROADCAST CONTROL INFORMATION TO MOBILE STATIONS

(75) Inventors: Sinikka Sarkkinen, Kangasala (FI); Kimmo Kettunen, Espoo (FI)

(73) Assignee: Nokia Corporation, Espoo (FI)

( * ) Notice: Subject to any disclaimer, the term of this patent is extended or adjusted under 35 U.S.C. 154(b) by 112 days.

(21) Appl. No.: 10/141,128

(22) Filed: May 9, 2002

(65) Prior Publication Data

US 2003/0211860 A1 Nov. 13, 2003

(51) Int. Cl.
*C10L 1/20* (2006.01)
(52) U.S. Cl. .................. 455/436; 455/453; 455/466
(58) Field of Classification Search ............... 455/453, 455/436, 466, 515, 522, 13.4
See application file for complete search history.

(56) References Cited

U.S. PATENT DOCUMENTS

| 5,737,703 | A | * | 4/1998 | Byrne | 455/442 |
|---|---|---|---|---|---|
| 6,144,673 | A | * | 11/2000 | Korus | 370/432 |
| 6,240,089 | B1 | * | 5/2001 | Okanoue et al. | 370/390 |
| 6,330,448 | B1 | | 12/2001 | Otsuka et al. | |
| 6,463,286 | B1 | * | 10/2002 | Salminen | 455/453 |
| 6,556,835 | B1 | * | 4/2003 | Raivisto | 455/466 |
| 6,577,609 | B1 | * | 6/2003 | Sharony | 370/312 |
| 6,591,103 | B1 | | 7/2003 | Dunn et al. | |

\* cited by examiner

*Primary Examiner*—Joseph Feild
*Assistant Examiner*—S. Smith
(74) *Attorney, Agent, or Firm*—Squire, Sanders & Dempsey, L.L.P.

(57) ABSTRACT

This invention is a system and a method of connecting at least one mobile station (14) in a wireless network (12) including mobile stations and a controller (18) to another network (20). The method includes transmitting a communication from at least one mobile station, while the at least one mobile station is activated in the wireless network, but is not terminated to the controller, to the another network to establish a connection between the at least one mobile station and the another network; and the another network transmits a transmission of control information using the connection to the at least one mobile station while the at least one mobile station is activated but is not terminated to the controller.

40 Claims, 1 Drawing Sheet

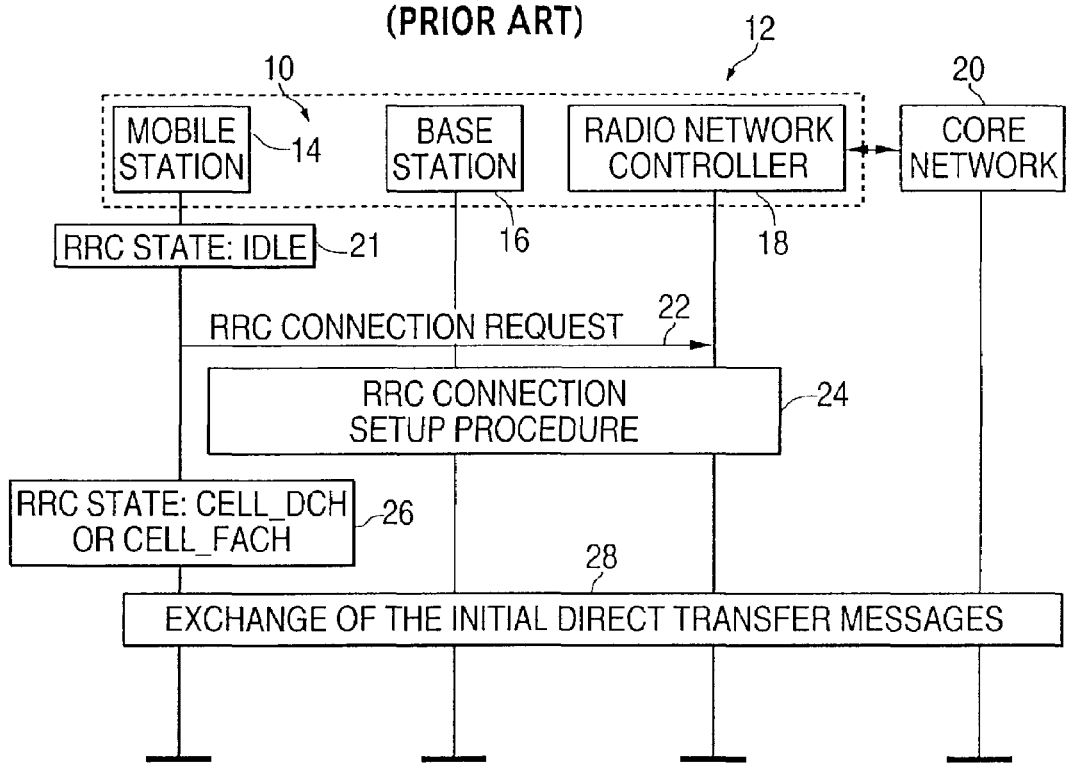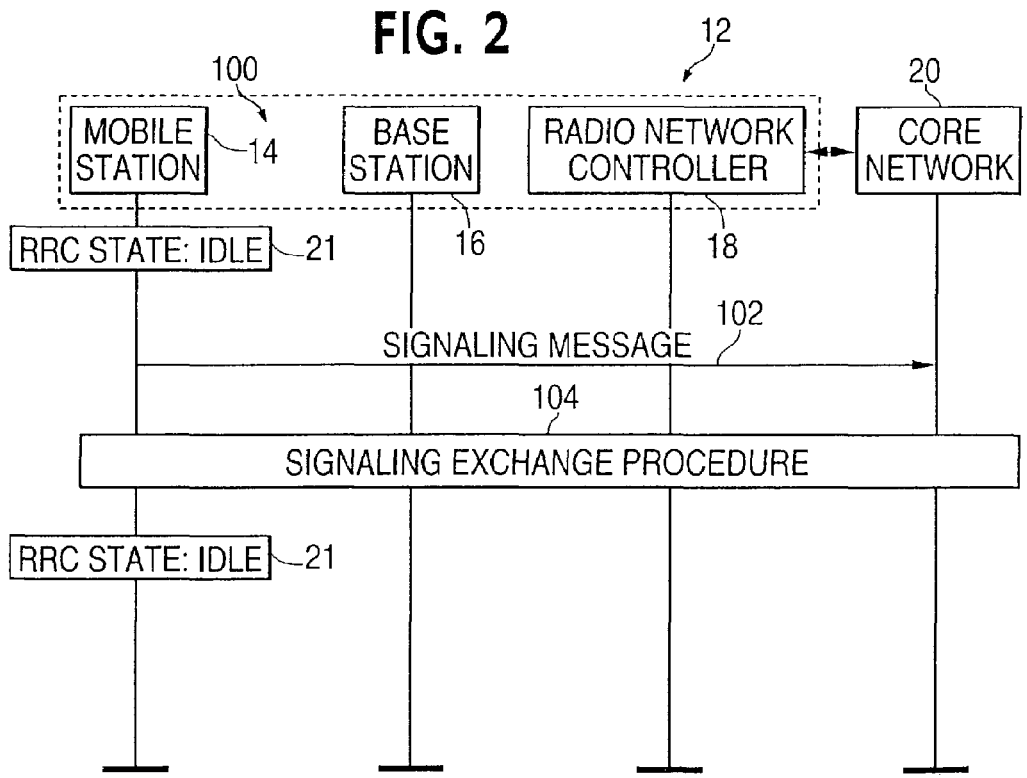

SYSTEM AND METHOD FOR CONNECTING MULTICAST OR BROADCAST CONTROL INFORMATION TO MOBILE STATIONS

BACKGROUND OF THE INVENTION

1. Field of the Invention

The present invention relates to systems and methods for the transmission of messages between at least one mobile station and another network without requiring connection to a controller of a wireless system containing the at least one mobile station.

2. Description of the Prior Art

FIG. 1 illustrates a diagram of a prior art system 10 and method in accordance with the Third Generation Partnership Project (3GPP) for providing multicast services. The system 10 includes a wireless network 12 which is comprised of a plurality of mobile stations 14 (only one is illustrated), a plurality of base stations 16 (only one is illustrated), and a radio network controller 18 which controls the use and integrity of the radio resources of the wireless network 12. An external network 20, which is independent of the wireless network 12 and is either a source of multicast transmissions to the plurality of mobile stations or acts as an intermediate network domain between a source of the multicast transmissions and the mobile station 14, is connected to the wireless network. Multicast transmissions originated from the external network 20 or from another network connected thereto are transmitted by the wireless network 12 to the plurality of mobile stations 14 which allow the users who control the mobile stations to receive a common and simultaneous wireless transmission through the air interface of the wireless network from base stations 16 to the mobile stations.

Broadcast and multicast transmissions are well known. Broadcast transmissions are sent to mobile stations, whose identification and location are unknown as the result of, for example, no joining procedure having been completed. Multicast transmissions, on the other hand, are transmitted to only those subscribers that have previously indicated an interest in receiving the multicast service from the network, who can be identified after performance of the multicast joining procedure or whose location can be determined by tracking procedures.

In order to establish if subscribers or users, who control the mobile stations 14, are willing to receive a service providing a multicast or restricted broadcast transmission, two phases are executed. The first phase is the service registration phase during which subscribers or users, who possess the mobile stations 14, agree with the a service provider or operator who controls the core network 20 or the external network connected thereto, to receive the multicast or restricted broadcast services. The second phase is the multicast joining or subscription phase during which the subscribers or users, who possess the mobile stations 14, indicate a willingness to the service provider to receive the multicast or restricted broadcast services in order to obtain currently defined service configuration parameters of the multicast or restricted broadcast services. If the current service parameters have already been given to the mobile stations 14 during the registration phase, the user of the mobile stations indicates a readiness to receive multicast or restricted broadcast services which enables the wireless network 12 and the external network 20 to make routing and resource management decisions which involve point to multipoint connections, such as a connection between the core network and the mobile stations regarding the offered service.

The most significant event of the above-described registration and multicast joining or subscription phase is the indication by the subscriber or user of the mobile stations 14 of a willingness to receive an ordered multicast or restricted broadcast service from the service provider controlling the external network 20 or network connected thereto. Subscription, which is required for the broadcast services (i.e. broadcast service, which are meant only to a restricted group of people), is always non time critical (i.e. it can be made e.g. hours before the reception of the broadcast service, whereas the joining phase can be time critical (i.e., it is made just before the multicast transmission of the particular service is started) or a nontime-critical transaction (i.e., the joining phase can be completed before the actual service activation). Depending on whether the joining transaction is a time-critical or a nontime-critical transaction, services involving different subscriber service charges can be defined for the multicast or restricted broadcast service. This is a significant aspect of providing multicast or restricted broadcast services.

In accordance with the 3GPP specifications, the execution of the above-described joining or subscription phase to obtain multicast or restricted broadcast transmissions requires that the wireless network have available uplink radio resources for the joining or subscription phase. As indicated in FIG. 1, when the mobile stations are in a radio resource control idle state 21 (defined in the 3GGP specifications as the state of user equipment being switched on, but not having an established termination to the controller of the wireless system), a radio resource control request 22 is transmitted from at least one mobile station 14 to the radio network controller 18. Under the 3GGP specifications, the only uplink radio resources available for the mobile stations in IDLE state 21 are the Physical Random Access Channel (PRACH) on the air interface and the Random Access Channel (RACH) as a transport channel, which channels, unfortunately, have other usages than completing the multicast joining or subscription phase necessary to obtain multicast or broadcast services. The PRACH and the RACH channels also transmit dedicated signaling messages related to the use of the mobile stations 14 and also permit transmission of small amounts of data on the user plane as defined in the 3GGP specifications. As a result, the transmission of multicast joining or subscription messages through the aforementioned PRACH and RACH channels between the mobile stations 14 and the radio network controller 18 can substantially utilize the capacity of these radio resources making these radio resources unavailable for other types of transmissions.

As illustrated in FIG. 1, after the transmission of the RRC connection request 22 to the radio network controller 18, a RRC Connection Setup Procedure 24 is completed to establish the aforementioned RRC connection (i.e. for the mobile stations 14, the radio network controller 18 creates the RRC context). Thereafter, the mobile stations 14 enter into a RRC Connected state (i.e. Cell_FACH or Cell_DCH state). Depending on which state the mobile stations 14 are ordered to enter, the radio network controller 18 reserves for the mobile stations either a dedicated channel DCH or the mobile stations are allowed to use a Forward Access Channel (FACH) in the downlink and a Random Access Channel (RACH) in the uplink as indicated at point 26. Finally, the actual transmission of the multicast or broadcast related signaling information transmission from the core network 20 to the at least one mobile station 14 occurs over the aforementioned channels established at point 26 as indicated by point 28.

Furthermore, an additional problem exists resultant from the transmission of the multicast joining or subscription messages. Multicast joining or subscription messages are, in accordance with the 3GGP specifications, "Non-Access Stratum" (NAS) messages which require an existing RRC connection as indicated at point 24. Since a high probability exists that most of the mobile stations 14 are in the idle state 21, the establishment of the RRC connection 24 for the only purpose of the multicast joining or subscription messages to most often obtain a later accessibility to multicast or broadcast services from the core network 20 can be a significant load on the wireless network 12. This load can decrease or interfere with access to the multicast transmissions from the core network 20 to the mobile stations 14. This interference is especially significant if a multicast joining phase is time-critical in view of the service agreement between the core network 20 and the subscribers of the at least one mobile station 12.

SUMMARY OF THE INVENTION

The present invention is a method and system of connecting at least one mobile station in a wireless network including mobile stations and a controller to another network without requiring connection to the controller. The establishment of the connection between the at least one mobile station and the another network is transparent to and does not involve any processing overhead on the part of the radio network controller in the wireless system in which the at least one mobile system is resident. The connection between the at least one mobile station and the another network, which in a preferred embodiment is a core network as defined by the 3GGP specifications or a network connected thereto, has a primary purpose of uplink transmissions of multicast or broadcast control information between the at least one mobile station and the core network to complete the multicast joining or subscription phase without involving communications between the mobile stations and the radio network controller. The connection between the at least one mobile station and the core network may be unidirectional or bi-directional. If the connection is unidirectional, the transmissions from the at least one mobile station are from mobile stations which have been authorized for the reception of transmissions from the another network, such as in the preferred application of the present invention in which multicast transmissions are made from the another network to the at least one mobile station. If the connection is bi-directional, the transmissions may be made from the another network in the downlink to the at least one mobile station and in the uplink from the at least one mobile station to the another network. The connection in accordance with the invention is a common connection shared by all authorized mobile stations, such as in the preferred embodiment, the authorized mobile stations which receive multicast or broadcast transmissions from the another network. The primary purpose of the connection is to transmit control messages in the form of signaling messages which are used to establish the connection between the at least one mobile station and the another network, such as the aforementioned multicast joining or subscription phase, including any status indication for changing multicast services to be received by the at least one mobile station.

The connection of the invention is separate from the RRC connection request of the prior art described above in conjunction with FIG. 1 and does not require the establishment of the RRC connection. The transmissions of control messages over the connection of the present invention between at least one mobile station and the another network are transparent to the wireless network and specifically the radio network controller. The transmission of a communication from the at least one mobile station in accordance with the invention to the another network may be NAS messages in accordance with the 3GGP specifications which do not contain any information pertaining to the at least one mobile station including an identification thereof. As a result of limiting the quantity of information transmitted with the communication from the at least one mobile station to the another network, the overall bandwidth of the connection is efficiently used permitting many mobile stations in the idle state of the prior art as described above in conjunction with FIG. 1 to establish connectivity through signaling messages to the another network, which does not involve any connectivity between the at least one mobile station and the controller of the wireless network. In essence, the wireless network is only a portal or pipe providing connectivity between the at least one mobile station and the other network.

A method of connecting at least one mobile station in a wireless network including mobile stations and a controller to another network in accordance with the invention includes transmitting a communication from at least one mobile station, while the at least one mobile station is activated in the wireless network but is not terminated to the controller, to the another network to establish a connection between the at least one mobile station and the another network and the another network transmits control information using the connection to the at least one mobile station while the at least one mobile station is activated but is not terminated to the controller. The control information transmitted by the another network may relate to a multicast transmission or a broadcast transmission to a plurality of the mobile stations from the another network; and the communication from the at least one mobile station may be an indication by the at least one mobile station to the another network that at least one mobile station is to receive the multicast transmission or the broadcast transmission from the another network. The connection of the at least one mobile station may be established using a logical channel; and the communication from the at least one mobile station to the another network may be transmitted using another logical channel used to connect the at least one mobile station to the controller. The communication from the at least one mobile station may be transmitted by the controller to the another network without processing by the controller. The communication may contain control information used in the control of providing services to the at least one mobile station from the another network. The communication may inform the network that the mobile station has crossed over a boundary in the wireless system. The connection from the at least one mobile station to the another network may be bi-directional. The another network may be a core network which is independent of the wireless network. The logical channel may make a connection between a single mobile station and the controller.

A system in accordance with the invention includes a wireless network including mobile stations and a controller and wherein at least one of the mobile stations transmits a communication, while the at least one station is activated in the wireless network but is not terminated to the controller, to the another network to establish a connection between the at least one mobile station and the another network and the another network transmits a transmission of control information using the connection to the at least one mobile station while the at least one mobile station is activated but is not terminated to the controller. The control information transmitted by the another network may relate to a multicast transmission or broadcast transmission to a plurality of the mobile stations from the another network and the communication from the at least one mobile station may be an indication by the at least one mobile station to the another network that at least one mobile station is to receive the multicast transmission or the broadcast transmission from the another network. The connection of the at least one mobile station may be established using a logical channel; and the communication from the at least one mobile station to the another network may be transmitted using another logical channel used to connect the at least one mobile station to the controller. The communication from the at least one mobile station may be transmitted by the controller to the another network without processing by the controller. The communication may contain control information used in the control of providing services to the at least one mobile station from the another network. The communication my inform the network that the mobile station has crossed over a boundary in the wireless system. The connection from the at least one mobile station to the another network may be bi-directional. The another network may be a core network which is independent of the wireless network. The logical channel may make a connection between a single mobile station and the controller.

BRIEF DESCRIPTION OF THE DRAWINGS

FIG. 1 illustrates a prior art system and method of obtaining connectivity between at least one mobile station and a radio network controller for establishing multicast transmissions between another network and the at least one mobile station.

FIG. 2 illustrates a block diagram of a system and method in accordance with the present invention.

Like parts are identified by like reference numerals in the drawings.

DESCRIPTION OF THE PREFERRED EMBODIMENT

FIG. 2 illustrates a system 100 in accordance with the invention which contains the same wireless system entities and core network in accordance with the prior art. However, the system 100 functions in a different manner as described below.

Unlike the prior art of FIG. 1, in accordance with the invention, the at least one mobile station 14, which is in RRC idle state 21, transmits a signaling message 102 from the at least one mobile station to the core network 20 in a manner which is transparent to the wireless system 12. The signaling message is on a logical channel different than the logical channel used for the RRC connection request 22 of the prior art.

As a result of the transparency of the signaling message 102, the RRC connection request 22 of the prior art of FIG. 1 is eliminated for the establishment of connectivity between the at least one mobile station 14 and the core network 20 for applications, such as the transmission of control information relating to multicast transmissions or broadcast transmissions, updating a location of the mobile stations 14 within geographic locations within the wireless network 12, with such individual geographic locations being comprised of multiple cells in order to avoid the transmission of numerous location messages to the core network each time the mobile stations move across a cell boundary or for other types of short control messages, which should not be transmitted using the prior art RRC connection request 22 in order to avoid increasing signaling overhead.

As indicated in FIG. 2, once the signaling message 102 is received by the core network 20 or a network connected thereto, a connection between the at least one mobile station 14 is established and the core network 20 transmits a transmission using the connection to the at least one mobile station while the at least one mobile station is activated but is not terminated to the controller, as indicated by signaling exchange procedure 104. The signaling exchange procedure may use any type of set up procedure which in itself is not part of the present invention. The connection between the core network and the mobile station 14 may be either unidirectional for the purpose of providing to the core network 20 signaling messages such as, without limitation, the indication that the subscriber has a willingness to receive multicast transmissions or broadcast transmissions from the core network or network connected thereto or may be a bi-directional connection for any application which requires more than unidirectional transmissions from the mobile stations to the controller. During the transmission of the signalling message 102 and the subsequent signalling exchange procedure, the mobile station 14 stays in the RRC idle state 21.

As described above, the mobile stations 14 are typically in the RRC idle state 21. The mobile stations 14 remain in RRC idle state 21 during which the mobile stations are turned on but are not terminated to the radio network controller 18 even when the signaling message 102 is sent to the core network 20 to establish the connection between the core network and the mobile stations. The connectivity established at point 104 in a multicast or broadcast application involves the completion of the multicast joining or subscription phase without resort to the RRC connection request 22 of the prior art and is only for transmissions of control messages such as multicast or broadcast related signaling data and control information or for control information related to the location of the mobile stations. The connectivity at point 104 is not used for an actual transmission of multicast or broadcast messages.

While the invention has been described in terms of preferred embodiments, it should be understood that numerous modifications may be made thereto without departing from the spirit and scope of the present invention. It is intended that all such modifications fall within the scope of the appended claims.

What is claimed is:

1. A method of connecting at least one mobile station in a wireless network including mobile stations and a controller to another network comprising:

transmitting a communication from the at least one mobile station, while the at least one mobile station is activated in the wireless network, but is not terminated to the controller, to the another network to establish a connection between the at least one mobile station and the another network; and the another network transmits control information using the connection to the at least one mobile station while the at least one mobile station is activated but is not terminated to the controller, wherein the control information transmitted by the another network relates to a multicast transmission or a broadcast transmission to a plurality of the mobile stations from the another network, and wherein the communication from the at least one mobile station is an indication by the at least one mobile station to the another network that the at least one mobile station is to receive the multicast transmission or broadcast transmission from the another network.

2. A method in accordance with claim 1 wherein:

a connection of the at least one mobile station to the controller is established using a logical channel; and the communication transmitted from the at least one mobile station to the another network is transmitted using another logical channel than a logical channel used for connecting the at least one mobile station to the controller.

3. A method in accordance with claim 2 wherein:

the communication from the at least one mobile station is transmitted to the another network without processing by the controller.

4. A method in accordance with claim 3 wherein:

the communication from the at least one mobile station s to inform the network that the mobile station has crossed over a boundary in the wireless system.

5. A method in accordance with claim 3 wherein:

the communication from the at least one mobile station includes control information used in the control of providing services to the at least one mobile terminal from the another network.

6. A method in accordance with claim 2 wherein:

the communication from the at least one mobile station is to inform the network that the mobile station has crossed over a boundary in the wireless system.

7. A method in accordance with claim 2 wherein:

the communication from the at least one mobile station includes control information used in the control of providing services to the at least one mobile terminal from the another network.

8. A method in accordance with claim 2 wherein:

the logical channel connection is a connection between a single mobile station and the controller.

9. A method in accordance with claim 1 wherein:

a connection of the at least one mobile station to the controller is established using a logical channel; and the communication transmits from the at least one mobile station is transmitted using another logical channel than a logical channel used for connecting the at least one mobile station to the controller.

10. A method in accordance with claim 9 wherein:

the communication from the at least one mobile station is transmitted to the another network without processing by the controller.

11. A method in accordance with claim 1 wherein:

the communication from the at least one mobile station is transmitted to the another network without processing by the controller.

12. A method in accordance with claim 11 wherein:

the communication from the at least one mobile station is to inform the network that the mobile station has crossed over a boundary in the wireless system.

13. A method in accordance with claim 11 wherein:

the communication from the at least one mobile station includes control information used in the control of providing services to the at least one mobile terminal from the another network.

14. A method in accordance with claim 1 wherein:

the communication from the at least one mobile station is transmitted to the another network without processing by the controller.

15. A method in accordance with claim 1 wherein:

the communication from the at least one mobile station is to inform the network that the mobile station has crossed over a boundary in the wireless system.

16. A method in accordance with claim 1 wherein:

the communication from the at least one mobile station includes control information used in the control of providing services to the at least one mobile terminal from the another network.

17. A method in accordance with claim 1 wherein:

the connection is in one direction from the at least one mobile station to the another network.

18. A method in accordance with claim 1 wherein:

the connection from the at least one mobile station to the another network is bidirectional.

19. A method in accordance with claim 1 wherein:

the another network is a core network which is independent of the wireless network.

20. A system in accordance with claim 1 wherein:

the another network transmits multicast or restricted broadcast transmissions using the connection to the at least one mobile station.

21. A system comprising:

a wireless network including mobile stations and a controller and wherein;

at least one of the mobile stations transmits a communication, while the at least one station is activated in the wireless network but is not terminated to the controller, to the another network to establish a connection between the at least one mobile station and the another network transmits a transmission of control information using the connection to the at least one mobile station while the at least one mobile station is activated but is not terminated to the controller, wherein the transmission of control information transmitted by the another network relates to a multicast transmission or a broadcast transmission to a plurality of the mobile stations and the communication from the at least one mobile station is an indication by the at least one mobile station to the another network that the at least one mobile station is to receive the multicast transmission or broadcast transmission from the another network.

22. A system in accordance with claim 21 wherein:

a connection of the at least one mobile station to the controller is established using a logical channel; and the communication transmits from the at least one mobile station is transmitted using another logical channel than a logical channel used for connecting the at least one mobile station to the controller.

23. A system in accordance with claim 22 wherein:

the communication from the at least one mobile station is transmitted to the another network without processing by the controller.

24. A system in accordance with claim 23 wherein:

the communication from the at least one mobile station is to inform the network that the mobile station has crossed over a boundary in the wireless system.

25. A system in accordance with claim 23 wherein:

the communication contains control information used in the control of providing services to the at least one mobile terminal from the another network.

26. A system in accordance with claim 22 wherein:
the communication from the at least one mobile station is to inform the network that the mobile station has crossed over a boundary in the wireless system.

27. A system in accordance with claim 22 wherein:
the communication from the at least one mobile station contains control information used in the control of providing services to the at least one mobile terminal from the another network.

28. A system in accordance with claim 22 wherein:
the another logical channel is a connection between a single mobile station and the controller.

29. A system in accordance with claim 21 wherein:
a connection of the at least one mobile station to the controller is established using a logical channel; and
the communication transmits from the at least one mobile station is transmitted using another logical channel than a logical channel used for connecting the at least one mobile station to the controller.

30. A system in accordance with claim 29 wherein:
the communication from the at least one mobile station is transmitted to the another network without processing by the controller.

31. A system in accordance with claim 21 wherein:
the communication from the at least one mobile station is transmitted to the another network without processing by the controller.

32. A system in accordance with claim 31 wherein:
the communication from the at least one mobile station is to inform the network that the mobile station has crossed over a boundary in the wireless system.

33. A system in accordance with claim 31 wherein:
the communication from the at least one mobile station contains control information used in the control of providing services to the at least one mobile terminal from the another network.

34. A system in accordance with claim 21 wherein:
the communication from the at least one mobile station is transmitted to the another network without processing by the controller.

35. A system in accordance with claim 21 wherein:
the communication from the at least one mobile station is to inform the network that the mobile station has crossed over a boundary in the wireless system.

36. A system in accordance with claim 21 wherein:
the communication from the at least one mobile station contains control information used in the control of providing services to the at least one mobile terminal from the another network.

37. A system in accordance with claim 21 wherein:
the connection is in one direction from the at least one mobile station to the another network.

38. A system in accordance with claim 21 wherein:
the connection from the at least one mobile station to the another network is bidirectional.

39. A system in accordance with claim 21 wherein:
the another network is a core network which is independent of the wireless network.

40. A system in accordance with claim 21 wherein:
wherein the another network is configured to transmit multicast or restricted broadcast transmissions using the connection to the at least one mobile station.

* * * * *